United States Patent [19]

Uesugi

[11] 3,930,720
[45] Jan. 6, 1976

[54] CONTROL DEVICE FOR A ZOOM LENS SYSTEM

[75] Inventor: Kyozo Uesugi, Izumi, Japan

[73] Assignee: Minolta Camera Kabushiki Kaisha, Japan

[22] Filed: Feb. 18, 1975

[21] Appl. No.: 550,521

[30] Foreign Application Priority Data

Feb. 18, 1974 Japan............................ 49-18502

[52] U.S. Cl............................... 350/187; 350/255
[51] Int. Cl.²............................................ G02B 15/00
[58] Field of Search........................... 350/187, 255

[56] References Cited
UNITED STATES PATENTS

| 3,059,534 | 10/1962 | Keznickl | 350/187 |
|---|---|---|---|
| 3,095,750 | 7/1963 | Mahn | 350/187 |
| 3,185,029 | 5/1965 | Peck | 350/187 |
| 3,399,943 | 9/1968 | Barr et al. | 350/187 |
| 3,450,019 | 6/1969 | Rossellini | 350/187 |

*Primary Examiner*—Alfred E. Smith
*Assistant Examiner*—Conrad J. Clark
*Attorney, Agent, or Firm*—Watson, Cole, Grindle & Watson

[57] ABSTRACT

A control device for a varifocal lens system of a type which includes an optical system having a lens group movable along the optical axis thereof and in which the amount of the movement of the movable lens group necessary for focusing is varied in response to the focal length of the optical system selected by the zooming operation. The control device includes a member pivotable about a point in response to the focusing operation, a first movable member having a portion operatively coupled to the pivotable member, and a second movable member operatively coupled with the movable lens group. The first movable member is movable in a first direction perpendicular to the optical axis in response to the zooming operation for varying the distance from the portion of the first movable member to the pivoting point of the pivotable member. The first movable member is also movable integrally with the second movable member, in a second direction parallel with the optical axis in response to a pivoting of the pivotable member for moving the movable lens group along the optical axis for focusing. In this manner, the amount of movement of the movable lens group is varied in accordance with the distance from the portion of the first movable member to the pivoting point of the pivotable member.

25 Claims, 7 Drawing Figures

CONTROL DEVICE FOR A ZOOM LENS SYSTEM

BACKGROUND OF THE INVENTION

The present invention relates to a control device for a zoom lens system of a type in which the amount of movement of a movable lens group (there being at least one such group within the system) along the optical axis for focusing is varied depending on the focal length of the entire optical system.

Throughout this specification, the term "focusing" refers to the focusing of light from an object to be photographed on a predetermined and definite image plane. The term "zooming" refers to a variance in the focal length of the optical system without changing the focusing condition to thereby only vary the magnification of the image of the object on the image plane.

In zoom lens systems, various focusing methods are known in which the front lens or front lens group nearest to the object to be photographed is moved along the optical axis. In the zoom lens system of such types, hereinafter referred to as the first type, the amount of movement of the front lens or the front lens group for focusing is independent of the focal length of the entire optical system, i.e. independent of the zooming position of the optical system.

The zoom lens system of this first type has the advantage that its control device can be of a relatively simple construction. This zoom lens system, however, has several disadvantages such as: the distortion of the image increases according to the increase of movement of the front lens or the front lens group along the optical axis toward the object in order to focus at a near object; and since the aperture of the front lens or front lens group is required to be large in order to prevent a fall off of luminosity of the image at the corner of the picture image when the system is zoomed to a wide-angle view, the zoom lens system is apt to become bulky and heavy and accordingly the zoom lens system becomes expensive and its portability deteriorates.

A different method of focusing is also known in which the focusing lens group to be moved along the optical axis for focusing is not restricted to a front lens or a front lens group, and in which the amount of movement for focusing the lens group is not constant but depends on the focal length of the entire lens system. Hereinafter, this type of zoom lens system will be referred to as the second type.

The zoom lens system of the second type avoids the disadvantages which arise with the first type system. The zoom lens system of this second type, however, does have the disadvantage that as the amount of movement of the movable lens group along the optical axis for focusing on the same object varies depending on the zoomed position of the optical system, it is difficult to perform an exact focusing operation at each zoomed position with a single focusing mechanism such as provided in the system of the first type. This particular disadvantage has therefore prevented widespread utilization of the zoom lens system of this type.

A control device has therefore been devised for use in the second type of zoom lens system as now set forth in U.S. Pat. No. 3,850,507. The system disclosed therein includes a number of lens barrels and helicoids interconnecting these barrels. The present invention is an improvement over the varifocal lens assembly of that patent.

SUMMARY OF THE INVENTION

An object of the present invention is to provide a control device for a zoom lens system which overcomes the abovementioned disadvantages.

Another object of the present invention is to provide a control device for a zoom lens system in which the amount of movement of a movable lens group along the optical axis of the system for focusing is varied depending on the focal length selected in accordance with the zooming operation.

A further object of the present invention is to provide a control device for a zoom lens system of a type in which the amount of movement for focusing along the optical axis of the movable lens group in a zoom lens system is varied depending on a focal length of the optical system which is arbitrarily specified by a zooming operation within an entire zooming range. The control device is such that the amount of movement for focusing of the movable lens group along the optical axis is able to be automatically controlled by the control device depending on each zooming position in an entire zooming range from a telescopic view to a wide-angle view. These objectives are accomplished by various embodiments of the control device in accordance with the present invention.

According to one embodiment, the control device for a zoom lens system includes a first movable lens group for zooming and which is movable along the optical axis in order to determine the focal length in response to a zooming operation, and a second movable lens group for focusing which includes a part of the lenses or lens groups in the zoom lens system and which is movable along the optical axis in response to a focusing operation. The amount of movement for focusing the second movable lens group along the optical axis is varied depending on the focal length selected as stated above and this movement is able to be automatically controlled by the control device in correspondence with the zooming operations.

In a modified embodiment of such a control device for the zoom lens system, the second movable lens group includes at least a part of the lenses of the first lens group. The amount of movement of the movable lens group is varied depending on the focal length selected, and movement of the movable lens group along the optical axis is able to be automatically controlled by the control device depending on the zooming operations.

In another embodiment of the control device for the zoom lens system according to the present invention, the control device also includes a first movable lens group for zooming, movable along the optical axis in response to a zooming operation. In this device, all of the lens groups of the optical system, including the first movable lens group for zooming, are movable as a unit for focusing. The amount of movement of the movable lens groups is again varied in accordance with the selected focal length of the zoom lens system and movement of the movable lens groups along the optical axis is able to be automatically controlled by the control device in dependence on the zooming operations.

In a further modified embodiment of the control device for the zoom lens system according to the present invention, the control device includes a manual mechanism with which the selection of normal photography and close-up photography can be carried out.

In still another embodiment of the present invention, the control device for the zoom lens system includes a member which is pivotable in response to a focusing operation and a focus adjusting member which is operated by the pivotable member so as to move a movable lens group along the optical axis for focusing. The control device controls the zoom lens system so that, when the focal length of the entire lens system is selected by the zooming operation, the amount of movement of the focus adjusting member is automatically adjusted by the pivotable member in response to the focal length selected as stated above. In this manner, movement of the movable lens group along the optical axis is determined so that the focusing is performed at the selected focal length.

The movable lens group referred to does not include those systems where only a front lens or a front lens group moves for the purpose of focusing. In such a system, the amount of movement of the front lenses or front lens group for focusing along the optical axis with respect to a certain photographic distance is the same, irrespective of the focal length of the entire zooming system selected by the zooming operation.

The movable lens groups for focusing can either exclude the movable lens group movable along the optical axis in response to the zooming operation, include at least a part of such zooming lens group or include all of the lens groups in a zoom lens system.

The focus adjusting member is associated with the movable lens group for focusing and moves the movable lens group for focusing along the optical axis in response to its movement so that the exact focusing may be performed. Consequently, the amount of movement of the focus adjusting member, which is controlled by pivoting of the pivotable member to a certain amount, varies depending on the focal length of the zoom lens system selected by the zooming operation.

The objects of the present invention as stated above are attainable by varying the associated portion of the pivotable member with the focus adjusting member depending on the selected focal length of a lens system.

DESCRIPTION OF THE PREFERRED EMBODIMENTS

Figure 1:
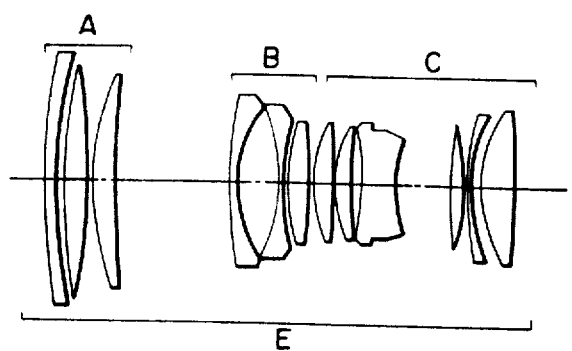
FIG. 1 is a diagrammatic side view of the lens elements of a zoom lens system according to the present invention.

FIG. 1 shows an optical system of a type in which focusing is performed by the movement of the entire optical system E along the optical axis. Hence, all of the lens groups of the system are movable as a unit along the optical axis under the control of a focus adjusting mechanism.

This lens system E includes the following three lens groups, counting from the object side: the first group A; the second group B; and the third group C. The lens groups B and C are moved relative to the first lens group A along the optical axis in accordance with the zooming operation, whereby the focal length of the zoom lens system is determined. After a certain focal length within a zooming range of the zoom lens system is selected, focusing on an object at a certain distance is performed by movement of the entire optical system E, including the three lens groups, A, B and C, as a unit along the optical axis.

In this case, the amount of movement of the entire optical system E is varied depending on the selected focal length. Qualitatively, the required amount of movement decreases when the focal length is set to a wide-angle view.

For example, in the optical system shown in FIG. 1, when the focal length is changed from 40 mm to 80 mm, the amount of movement of the entire optical system E to the left along the optical axis necessary for changing the object to be focused from one located at the infinite distance to one located at 1 m, is changed from 1.9 mm to 7.1 mm. In that case, the difference between these amounts of movement is 5.2 mm.

It, therefore, becomes necessary to automatically adjust the difference of the amounts of movement for focusing in relationship with the zooming operation.

Figure 2:
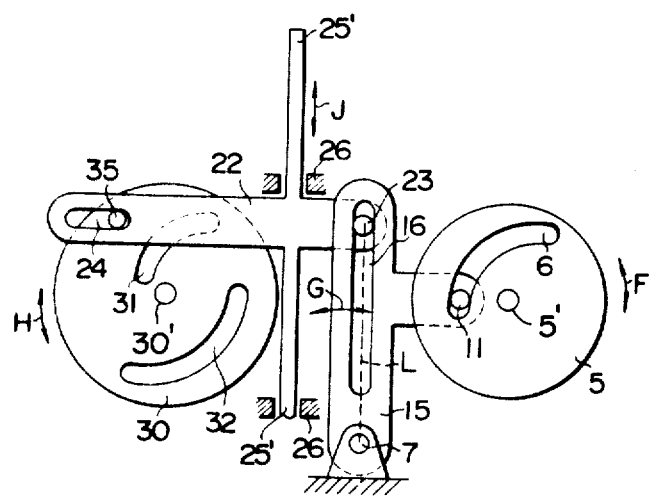
FIG. 2 is a diagrammatic side view illustrating the principle of construction of a control device according to the present invention.

FIG. 2 shows the principle construction of the control device for such a zoom lens system, in accordance with the present invention, for providing automatic adjustment of the arrangement. A focusing disk 5, which is rotatable about axis 5' in relationship to the focusing operation, has a cam groove 6. A lever 15 is pivotally mounted on a shaft 7 for pivotable movement in the direction of arrow G. A pin 11, mounted on lever 15, is engaged with cam groove 6. Lever 15 also has a cam groove which extends from shaft 7 in a radial direction.

A zooming disk 30 is rotatably mounted on axis 30'. A pin 35 is mounted on disk 30 and two cam grooves 31 and 32 are formed within the disk. Cam groove 31 is provided in order to determine the axial position of the second lens group B and cam groove 32 is provided in order to determine the axial position of the third lens group C. To achieve this, pins mounted on the lens mountings of lens groups B and C are respectively engaged with cam grooves 31 and 32, although not shown in this Figure.

A slider member 22 is provided for assisting in controlling movement of the entire lens system E, which includes the first lens group A, the second lens group B, and the third lens group C, along the optical axis, for the purpose of performing the focusing operation. The shaft 25' provided on slider 22 is engaged with a carrier 26 and is moved with the carrier in an axial direction to either the right or the left. A pin 35 mounted on disk 30 is engaged with a cam groove 24 provided in slider 22. A pin 23, which is also mounted on slider 22, is engaged with cam groove 16. Accordingly, when zooming disk 30 is rotated in the direction ofo the arrow H in response to a zooming operation, shaft 25' is shifted up and down, restricted only by the guide of carrier 26 and slidier 22, in the direction of the arrow J perpendicular to the axial direction of the slider.

When disk 30 is rotated, movement of the pins mounted on the lens mountings of the second lens group B and the third lens group C relative to carrier 26 is effected by their respective cam grooves 31 and 32 and thereby the zooming operation is performed, i.e. the focal length of the entire optical system E is selected. Slider 22 is simultaneously moved in the direction of J, thereby changing the position of pin 23 inside cam groove 16. In this manner, the distance L from shaft 7 to pin 23 is determined.

After the focal length of the entire optical system is thus determined, as focusing disk 5 is rotated in the direction of the arrow F, pivotable lever 15 is pivoted about shaft 7 in the direction of the arrow G together with pin 11 engaged with cam groove 6 on disk 5. In response to the pivoting of pivotable lever 15, slider 22 is driven to move to the right or left, i.e. in an axial direction thereof, thereby shifting carrier 26 in the axial direction by the same amount of movement as slider 22, for focusing of the entire optical system. Since the amount of movement of slider 22 is determined depending on both the pivotal angle of pivotable lever 15 and the distance L, the focusing can be adjusted in accordance with the selected focal length.

Figure 3:
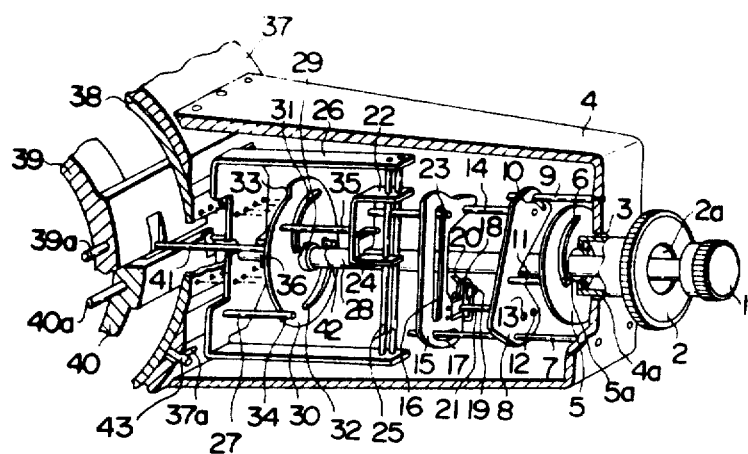
FIG. 3 is a perspective view showing an embodiment of the control device for the zoom lens system shown in FIG. 1.
Figure 4A:
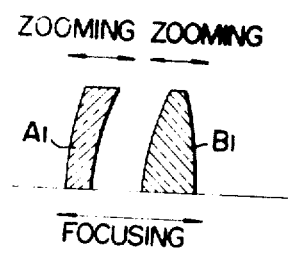
FIGS. 4A, B, C and D are schematic diagrams showing various arrangements of the zoom lens system in accordance with the present invention.
Figure 4B:
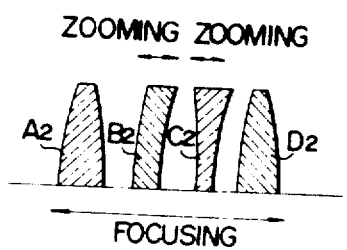
Figure 4C:
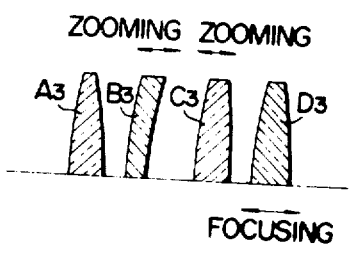
Figure 4D:
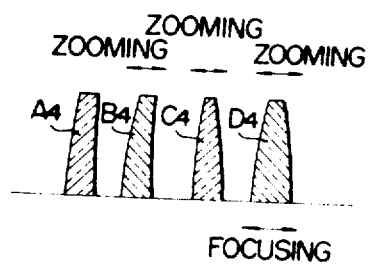

FIG. 3 illustrates an embodiment of a control device based on the above principle of the present invention and used in the zoom lens system shown in FIG. 1. The same reference numerals are used for the same or equivalent parts as the embodiment illustrated in FIG. 2.

A fixed barrel 37, for example, is connected to a lens mount of a camera body. This barrel will not be moved by either a focusing operation or a zooming operation. A control box 4 is attached to barrel 37. Fixedly mounted at the outside edge of a sleeve 3, which is pivotally positioned within an aperture 4a of control box 4, is a focusing knob 2 having a central aperture 2a, and focusing disk 5 is fixedly mounted at the other edge of sleeve 3. In the center of focusing disk 5, an aperture 5a is formed in alignment with aperture 2a, and cam groove 6 is also formed within disk 5, as mentioned above.

A focusing barrel 38, carrying the first lens group A, is coaxially arranged inside barrel 37 in such a manner that it is slidable within barrel 37 in the axial direction. A pin 43 mounted on focusing barrel 38 is slidable within a guide slot 37a provided on barrel 37 in a parallel direction to the optical axis.

A U-shaped carrier 26, the bottom of which is attached to barrel 38 for focusing, is moved in the axial direction within control box 4 in conjunction with focusing barrel 38. A shaft 28 is rotatably journaled by a shaft 36 having one end fixed to the bottom of carrier 26. Rotatable shaft 28 passes through aperture 5a, sleeve 3, and aperture 2a, and projects out of control box 4 and focusing knob 2. A zooming knob 1 is mounted outside control box 4 on the end portion of rotatable shaft 28.

Two cam grooves 31 and 32 are provided in zooming disk 30 which is fixedly mounted to rotatable shaft 28 by a bushing 29. Also, a pin 35 is provided on disc 30 and two stoppers or shoulders 33 and 34 are formed on the disk. When zooming disk 30 rotates, stoppers 33 and 34 are engageable with a stopper pin 27 mounted on carrier 26. This engagement stops the rotation of zooming disk 30, thereby restricting the rotational angle of disk 30.

A first lever 8 is pivotally mounted on a shaft 7 in control box 4. Lever 8 is provided with a guide slot 10 arched about shaft 7, two holes 12 and 13 and a pin 11. A guide pin 9 mounted on control box 4 is engaged with guide slot 10 so that it can govern the movement of first lever 8 when pivoting about shaft 7 in the predetermined plane. Further, pin 11 is engaged with cam groove 6 on focusing disk 5 to convey the rotation of disk 5 to first pivotable lever 8 thereby causing lever 8 to pivot.

A second pivotable lever 15 is fixedly mounted on a shaft 14 rotatably mounted at the back of lever 8 parallel to shaft 7. Lever 15 extends at a right-angle to shaft 14 and is pivotable together with first pivotable lever 8. An arched groove 17 within lever 15 is engaged with the extended portion of shaft 7. A cam groove 16 is also formed on second pivotable lever 15 and a resilient plate 18 is located at the side of second pivotable lever 15. A control pin 21 mounted on resilient plate 18 is biased by plate 18 so as to engage with either hole 12 or 13 of first pivotable lever 8. In this case, the selection of which hole is to be engaged with control pin 21 is able to be determined by operation of a manually operable member 20 having a claw 19 which is engaged with resilient plate 18. For instance, if member 20 is manually switched from a first position to a second position, claw 19 deforms plate 18 to permit control pin 21 to be released from hole 12 and causes second pivotable lever 15 to pivot about shaft 14 relative to first pivotable lever 8, and then control pin 21 in turn engages with the other hole 13. This operation is intended for the change between the following two cases: when focusing is performed on an object at a normal distance and when performed on an object at a very close distance.

Two guide pins 25 are connected to carrier 26 in a vertical direction perpendicular to the optical axis. A U-shaped slider 22, which is slidable up and down along guide pins 25, is arranged on carrier 26. A pin 23, mounted on the bottom of slider 22 and extending parallel to both shafts 7 and 14, is engaged with cam groove 16 on second pivotable lever 15.

In the bottom wall of slider 22, a cam 24 lies horizontally and perpendicularly to guide pins 25. Pin 35 mounted on the disk 30 is engaged with cam groove 24.

A first movable barrel 40 loosely inserted in focusing barrel 38 is movable along the optical axis by means of a guide rod 40a and carries the third lens group C. A pin 42 mounted on first movable barrel 40 in the radial direction is slidably engaged with cam groove 32. Similarly, a second movable barrel 39 loosely inserted in the focusing barrel 38 is movable along the optical axis by means of a guide rod 39a and carries the second lens group B. A pin 41 mounted on barrel 39 in the radial direction is slidably engaged with cam groove 31 of zooming disk 30.

The operation of the above-described system is as follows. Rotation of zooming knob 1 effects rotation of zooming disk 30 whereby its cam grooves 31 and 32, by way of respectively engaged pins 41 and 42, move first movable barrel 40 and second movable barrel 39 in the axial direction relative to focusing barrel 38. Thus, the second lens group B and the third lens group C are moved along the optical axis respectively relative to the first lens group A, whereby zooming is performed, i.e., the focal length of the entire optical system E is changed. Also, because pin 35 on zooming disk 30 is rotated therewith, slider 22 is moved up and down in a direction perpendicular to the optical axis, with such movement being guided by guide pins 25. Thus, pin 23 on slider 22 is also moved up and down inside cam groove 16. If pin 23 is positioned at a certain point, the distance between pin 23 and the rotatable shaft 7 is determined.

Moreover, when focusing knob 2 is rotated, focusing disk 5 is rotated causing first pivotable lever 8 by way of cam groove 6 and pin 11 to be pivoted about shaft 7. At the same time, second pivotable lever 15 is pivoted in the same direction about shaft 7 by way of shaft 14 and control pin 21 engaged with either hole 12 or 13. Accordingly, slider 22 is moved by way of pin 23 slidably engaged with cam groove 16 to the right or left in a horizontal direction parallel to the optical axis, thereby causing carrier 26 together with fixed shaft 36, rotatable shaft 28, and zooming disk 30 to move in the axial direction. Then, since focusing barrel 38 is fixed to the bottom of carrier 26, and first and second movable barrels 40 and 39 are coupled with zooming disk 30 by way of cam groove 32 and pin 42 and by way of cam groove 31 and pin 41 respectively, barrels 38, 39 and 40 are moved along the optical axis for the same distance in synchronism with each other. Thus, all the lens groups A, B and C are also moved along the optical axis for the same distance so as to perform the focusing operation.

In this case, the difference in the amount of movement, which is dependent on the focal length of the entire optical system E selected by the zooming operation, is brought about by the variation of the distance between pin 23 of slider 22, which is determined in accordance with the rotating position of zooming disk 30, and rotary shaft 7 of first pivotable lever 8.

Irrespective of the focal length of the entire optical system, focusing can be performed on an object located at a certain distance by rotating focusing knob 2 for the same amount. Furthermore, according to the construction shown in FIG. 3, when zooming knob 1 is rotated after focusing knob 2 has been rotated to pivot first and second pivotable levers 8 and 15 to a desired position, pin 23 of slider 22 is guided by cam groove 16 of second pivotable lever 15. When slider 22 is moved along guides 25 in accordance with the rotation of the zooming knob 1, carrier 26 is moved to the right or left along the optical axis. Consequently, when zooming knob 1 is rotated, first movable barrel 40 and second movable barrel 39 are axially moved relative to focusing barrel 38 for zooming. At the same time, carrier 26, fixed shaft 36, rotatable shaft 28, and zooming disk 30 are moved in synchronism with each other in the axial direction in accordance with the movement of slider 22 in the axial direction. In this way the focal point of the entire optical system which has been adjusted by the focusing operation is automatically compensated in accordance with the change of the focal length caused by the zooming operation. That is, in a situation wherein a certain focal length is selected and an object at a certain distance is focused, clear focusing on the same object can be maintained even if the focal length is changed by the zooming operation.

When focusing knob 2 is rotated, after manually operable member 20 has been operated so that control pin 21 is engaged with hole 13 and the relative position of second pivotable lever 15 to first pivotable lever 8 has been changed in the plane perpendicular to the longitudinal direction of shaft 7, slider 22 is moved in the axial direction more than in the case where control pin 21 is engaged with hole 12. This is true even if zooming knob 1 is set to a wide-angle view side, i.e. if pin 23 of slider 22 is positioned closer to shaft 7. It, therefore, is possible for close-up photography to be performed. If there is no need to enable a close-up photography operation, however, pivotable levers 8 and 15 can be replaced by a single pivotable member.

This control device has been described for utilization with a zoom lens system having three lens groups A, B and C, such as shown in FIG. 1. There are also several other varifocal lens systems such as shown in FIGS. 4 A, B, C and D with which the control device of the present invention is applicable.

FIG. 4 A shows a varifocal lens system having a first lens group $A_1$ and a second lens group $B_1$. The first lens group $A_1$ and the second lens group $B_1$ are moved for certain a mounts independently of each other in the axial direction. Focusing is performed by moving both lens groups $A_1$ and $B_1$ as a unit along the optical axis. This type of optical system may be coupled with the control mechanism of the present invention, such as shown, for example, in FIG. 3. For t his purpose, the first lens group $A_1$ will be held by first movable barrel 40, the second lens group $B_1$ will be held by second movable barrel 39, and movable barrels 40 and 39 together with focusing barrel 38 are moved as a unit in the axial direction relative to fixed barrel 37 by the focusing operation. In this case, the shapes of cam groove 6, and cam grooves 31 and 32 may be varied in accordance with the desired movement of lens groups $A_1$ and $B_1$.

FIG. 4 B shows a varifocal lens system comprising four lens groups. The focal length of the system in selected by a zooming operation in which the second lens group $B_2$ and the third lens group $C_2$ are moved separately along the optical axis. Focusing of the system is performed by moving the first lens group $A_2$, the second lens group $B_2$, the third lens group $C_2$, and the fourth lens group $D_2$ as a unit along the optical axis. In this case, for example, in utilizing the control device illustrated in FIG. 3, focusing barrel 38 holds the first lens group $A_2$ and the fourth lens group $D_2$, first movable barrel 40 holds the second lens group $B_2$ and second movable barrel 39 holds the third lens group $C_2$.

Both FIGS. 4 C and 4 D show varifocal lens systems in which focusing is performed by moving a part of the lens group which is placed behind the lens group for performing the zooming operation. In the system shown in FIG. 4 C, the first lens group $A_3$ is fixed, the second lens group $B_3$ and the third lens group $C_3$ are independently moved along the optical axis by the zooming operation, and focusing is performed by moving the fourth lens group $D_3$ along the optical axis by the focusing operation. In the system shown in FIG. 4 D, the first lens group $A_4$ is fixed, the second lens group $B_4$, the third lens group $C_4$, and the fourth lens group $D_4$ are independently moved along the optical axis by the zooming operation, and focusing is performed by moving the fourth lens group $D_4$ along the optical axis by the focusing operation.

The control device of the present invention is similarly applicable to the varifocal lens system of the type shown in FIGS. 4 C and 4 D. In this case, as the focal length becomes larger, the amount of movement of the fourth lens group $D_3$ and $D_4$ increases as in the previously described embodiments. Consequently, in such varifocal lens systems, the function of the invention will be attained in the following manner: more than one lens group, which are movable for zooming, are moved along the optical axis independently of each other in accordance with the operation of a zoom control member thereby effecting the selection of the focal length. On the other hand, there may be provided a pivotable lever pivotable in accordance with the operation of a focus adjusting member and a movable member having an inclination to approach the center of pivoting of the pivotable lever as the zoom control member is varied closer to a wide-angle view and associated with the pivotable lever. In this manner, due to the pivoting of the pivotable lever, the fourth lens group, either $D_3$ or $D_4$, alone is moved along the optical axis relative to the other lens groups for an amount in dependence upon the distance between the movable member and the pivotable lever. Thus, the focusing operation will be automatically accomplished in accordance with the operated position of the zoom control member, i.e., the focal length of the entire optical system.

As many apparently widely different embodiments of this invention may be made without departing from the spirit and scope thereof, it is to be understood that within the scope of the appended claims the invention may be practiced otherwise than as specifically described.

I claim:

1. A control device for a zoom lens system having an optical system including a focus lens unit and a zoom lens unit coaxially arranged and movable along the optical axis of the optical sytstem, the position of the focusing lens unit being varied in accordance with the focal length of the optical system, the control device comprising:

zoom adjusting means for moving said zoom lens unit along the optical axis in response to a zooming operation so as to vary the focal length of said optical system;

means pivotally mounted about a point and being pivotable in response to a focusing operation; and, focus adjusting means having a portion coupled to said pivotable means and additionally coupled to said focus lens unit, said focus adjusting means being operated in response to movement of said pivotable means and in response thereto causing movement of said focus lens unit along said optical axis for a distance dependent upon the distance between said coupled portion and said pivoting point so as to adjust the focal point of said optical system, said focus adjustment means also being coupled to said zoom adjusting means so that said coupled portion is movable in response to operation of said zoom adjusting means so as to vary the distance between said coupled portion and said pivoting point in accordance with a variance in the focal length of said optical system caused by the zooming operation.

2. A control device as defined in claim 1, wherein said zoom lens unit forms one part of said focus lens unit and is arranged behind the outer part of said focus lens unit with respect to an object.

3. A control device as defined in claim 1, wherein said zoom lens unit is arranged in front of said focus lens unit with respect to an object.

4. A control device as defined in claim 1, wherein said zoom lens unit and said focus lens unit comprise the same lens groups.

5. A control device as defined in claim 1, wherein said focus lens unit forms one part of said zoom lens unit and is arranged behind the other part of said zoom lens unit with respect to an object.

6. A control device as defined in claim 1 further comprising a barrel structure supporting said focus lens unit and said zoom lens unit; and wherein said zoom control means, said pivotable means and said focus adjustment means are provided outside of said barrel structure; and said focus adjustment means includes:

a first movable member movable in a first direction parallel to said optical axis and coupled with said focus lens unit so as to move said focus lens unit along said optical axis for adjustment of the focal point; and, a second movable member providing said coupled portion, said second movable member being associated with said first movable member and said zoom control means so as to be movable in a second direction perpendicular to the first direction independently of said first movable member, in response to the operation of said zoom control means so as to vary the distance between said coupled portion and said pivoting point in accordance with a variance in the focal length and movable in said first direction together with said first movable member, in response to movement of said pivotable means, for a distance dependent upon the distance between said coupled portion and said pivoting point.

7. A control device as defined in claim 6, wherein said zoom adjusting means includes a rotatable member coupled to said zoom lens unit and said second movable member, said rotatable member having rotatable in response to a zooming operation so as to move said zoom lens unit along the optical axis to vary the focal length of said optical system and also so as to move said second movable member in the second direction to vary the distance from said coupled portion to said pivoting point.

8. A control device as defined in claim 7, wherein said second movable member has a slot extending in the first direction, and said rotatable member has a pin provided at a radially offset position from its rotating center, said slot and said pin cooperating to move said second movable member in the second direction in accordance with the rotation of said rotatable member.

9. A control device as defined in claim 6 futher comprising means for conveying a focusing operation to said pivotable means so that said pivotable means can be pivoted in response to such focusing operation.

10. A control device for a zoom lens system including an optical system having first, second and third lens groups coaxially arranged and positioned away from an object in such order, a fixed barrel, a first movable barrel carrying the first lens group and movable along the optical axis of the optical system, a second movable barrel carrying the second lens group and movable along the optical axis, and a third movable barrel carrying the third lens group and movable along the optical axis, for focusing the first to third movable barrels being moved as a unit by an amount dependent upon the focal length of the optical system selected by a zooming operation, the control device comprises:

a first manually operable member for focusing;

a second manually operable member for zooming;

means for zoom control operable in response to operation of said second manual member so as to move said second and third movable barrels along the optical axis for select distances for varying the focal length of said optical system;

means pivotable about a pivoting point lying in a plane parallel to the optical axis and being pivoted in response to operation of said first manual member;

first focus adjustment means movable in a first direction parallel to the optical axis to move said first, second and third movable barrels along the optical axis as a unit for adjustment of the focal point of said optical system; and, second focus adjustment means having a portion operatively coupled with said pivotable means, and said second means also being operatively coupled with said first movable member so as to be moved in the first direction with said portion in response to a pivoting of said pivotable means, such movement in the first direction being for an amount dependent upon the distance between said portion and said pivoting point, said second focus adjustment means also being operatively coupled with said zoom control means so as to be moved in a second direction perpendicular to the first direction independently of said first focus adjustment means in response to operation of said zoom control means to vary the distance between said portion and said pivoting point in accordance with a variance in the focal length.

11. A control device as defined in claim 10, wherein said pivotable means includes a first pivotable member pivotable about said pivoting point in response to the focusing operation and a second pivotable member pivotable about said pivoting point together with said first pivotable member and operatively coupled with said portion of said second focus adjustment means; and further comprising manually operable means for changing the relative position of said second pivotable member to said first pivotable member in a pivoting plane of said second pivotable member.

12. A control device as defined in claim 11 further comprising a pin connecting said first pivotable member and said second pivotable member together at their substantially end portions offset from said pivoting point so as to permit said second pivotable member to pivot about said pin in the pivoting plane of said second pivotable member by the operation of said manual means so at to change the relative position of said second pivotable member to said first pivotable member in said pivoting plane of said second pivotable member.

13. A control device for an objective lens system of the type in which the focal length is variable in response to a zooming operation, the objective lens system having at least one lens group movable in response to a focus adjusting operation so that the amount of movement of such lens group for an object at the same distance varies in reliance upon the focal length adjusted, the control device comprising:

zoom means responsive to a zooming operation for adjusting said objective lens system to vary its focal length;

focus means coupled with said at least one lens group for adjusting the position of said lens group;

control means angularly movable about a rotational axis in response to a focus adjusting operation and associated with said focus means at an associating point positioned at a distance from said rotational axis so as to determine the position of said focus means as a function of the angular position of said control means; and, adjusting means for varying the distance between said associating point and said rotational axis in accordance with the focal length adjusted by said zoom means.

14. A control device as defined in claim 13, further comprising a barrel structure supporting said lens system; wherein said control means is disposed outside of said barrel structure in such a manner that said rotational axis is substantially perpendicular to the optical axis of said lens system.

15. A control device as defined in claim 14, wherein: said zoom means includes a disk plate rotatable about an axis parallel with said rotational axis and cam means for determining the focal length in accordance with the rotational position of said disk plate; and focus means includes an intermediate member coupled with said control means at said associating point and guide means for guiding said intermediate member to move in such a specific direction as to vary the distance between said associating point and said rotational axis; and said adjusting means includes means for moving said intermediate member in such specific direction in accordance with the rotation of said disk plate.

16. A control device as defined in claim 15, wherein said focus means further includes a frame structure interconnected with said lens groups for focus adjustment so as to move therewith, and said guide means is formed on said frame structure.

17. A control device as defined in claim 16, wherein said lens system includes two groups of lenses movable relative to each other for varying the focal length and interlocked with said disk plate to be controlled thereby, and said disk plate is mounted on said frame structure to move therewith.

18. A control device as defined in claim 17, wherein said control means includes a control plate provided with a straight groove extending in a radial direction with respect to said rotational axis, and said intermediate member has a pin fixed thereon and engaged with said groove.

19. A control device as defined in claim 18, wherein: said frame structure is movable along the optical axis of said lens system for focus adjustment; said guide means guides said intermediate member in a direction substantially perpendicular to the direction of movement of said frame structure; said intermediate member has a slot; said disk plate has a pin fixed thereon and engaged with said slot; said cam means includes cam slot means formed on said disk plate such that said pin of said disk plate moves substantially in parallel with said intermediate member with said cam slot means selecting approximately a middle focal length in the available range.

20. A control device for a varifocal objective lens system of the type in which the amount of focus adjustment varies as a function of the focal length of the system, said control device comprising:

first operable means angularly movable about a rotational axis in response to a focus adjusting operation;

second operable means movable in response to a focal length adjusting operation to vary the focal length of the system;

focus control means for adjusting the focusing condition of said objective lens system in accordance with the angular position of said first operable means, said focus control means being coupled between said first and second operable means such that the distance from said rotational axis to an acting point where said first operable member acts on said focus control member varies in accordance with the movement of said second operable means so that the amount of adjustment for focusing for the same angular movement of said first operable means varies as a function of the focal length adjustment.

21. A control device as defined in claim 20, further comprising a barrel structure supporting lens system; and wherein said control means is disposed outside of said barrel structure such that said rotational axis is substantially perpendicular to the optical axis of said lens system and said second operable means includes a disk plate rotatable about an axis substantially parallel with said rotational axis.

22. A control device as defined in claim 21, wherein said objective lens system includes two groups of lenses movable relative to each other, one of said lens groups being interlocked with said focus control means to be controlled thereby, and said disk plate has cam means for controlling the relative movement of said lens groups.

23. A control device as defined in claim 21, wherein: said objective lens system includes two groups of lenses movable relative to each other; said disk plate has cam means for controlling the relative movement of said lens groups and said disk plate is associated with said two lens groups in such a manner that rotation of said disk plate causes the relative movement; and said focus control means is movable in accordance with the angular position of said first operable means together with said disk plate to move said two lens groups in response to adjustment of the focusing condition.

24. A control device as defined in claim 23, wherein said focus control means includes an intermediate member movable in response to a rotation of said disk plate and a frame structure having guide means for controlling the movement of said intermediate member, said disk plate is rotatably mounted on said frame structure and said intermediate member is interconnected with said control means to vary the distance between said rotational axis and said acting point in accordance with the movement of said intermediate member.

25. A control device as claimed in claim 24, wherein: said frame structure is movable along the optical axis of said objective lens system for focus adjustment; said guide means guides the intermediate member in a direction substantially perpendicular to the direction of movement of said frame structure; said intermediate member has a slot; said disk plate has a pin fixed thereon and engaged with said slot; said cam means includes two cam slots formed on said disk plate such that said pin of said disk plate moves in parallel with said intermediate member at the middle of the zoom control range.

* * * * *